Dec. 24, 1935.  G. GASTRICH  2,025,383
YARN CONTROL AND CONTACT MEANS
Filed Sept. 22, 1934  4 Sheets-Sheet 3
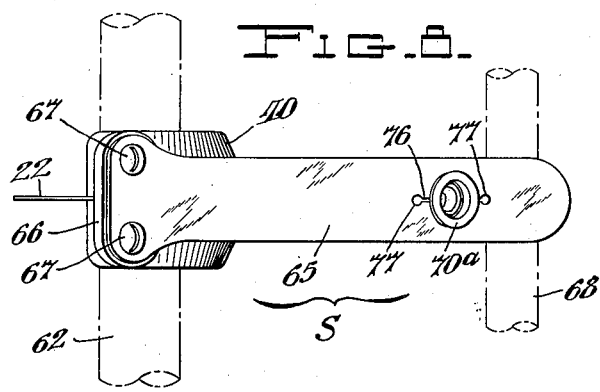
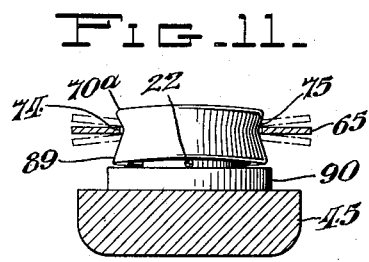
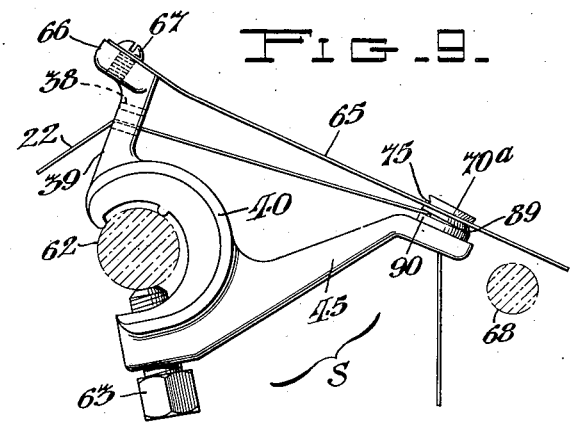
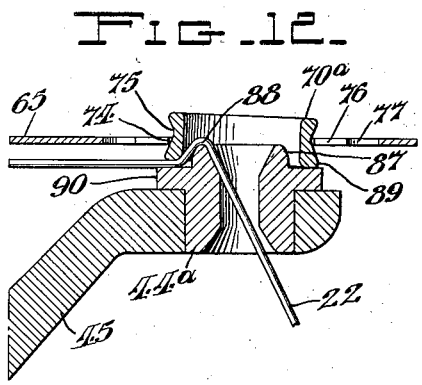
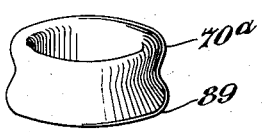
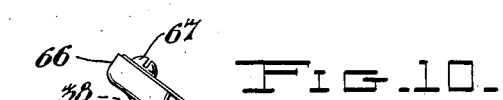
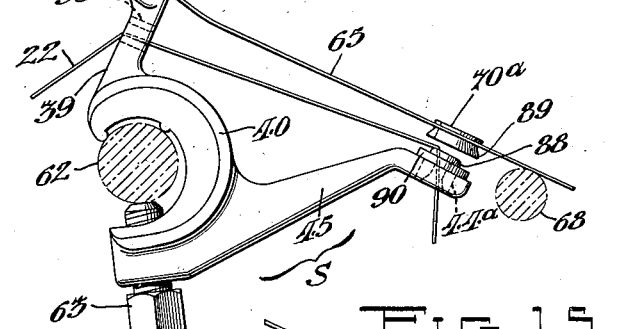
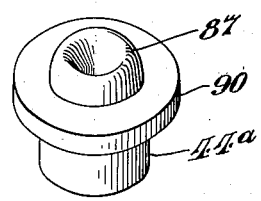
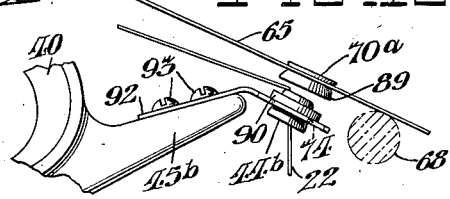
INVENTOR:
*Gustav Gastrich*,
BY *Alfred E. Dschinger*,
ATTORNEY.

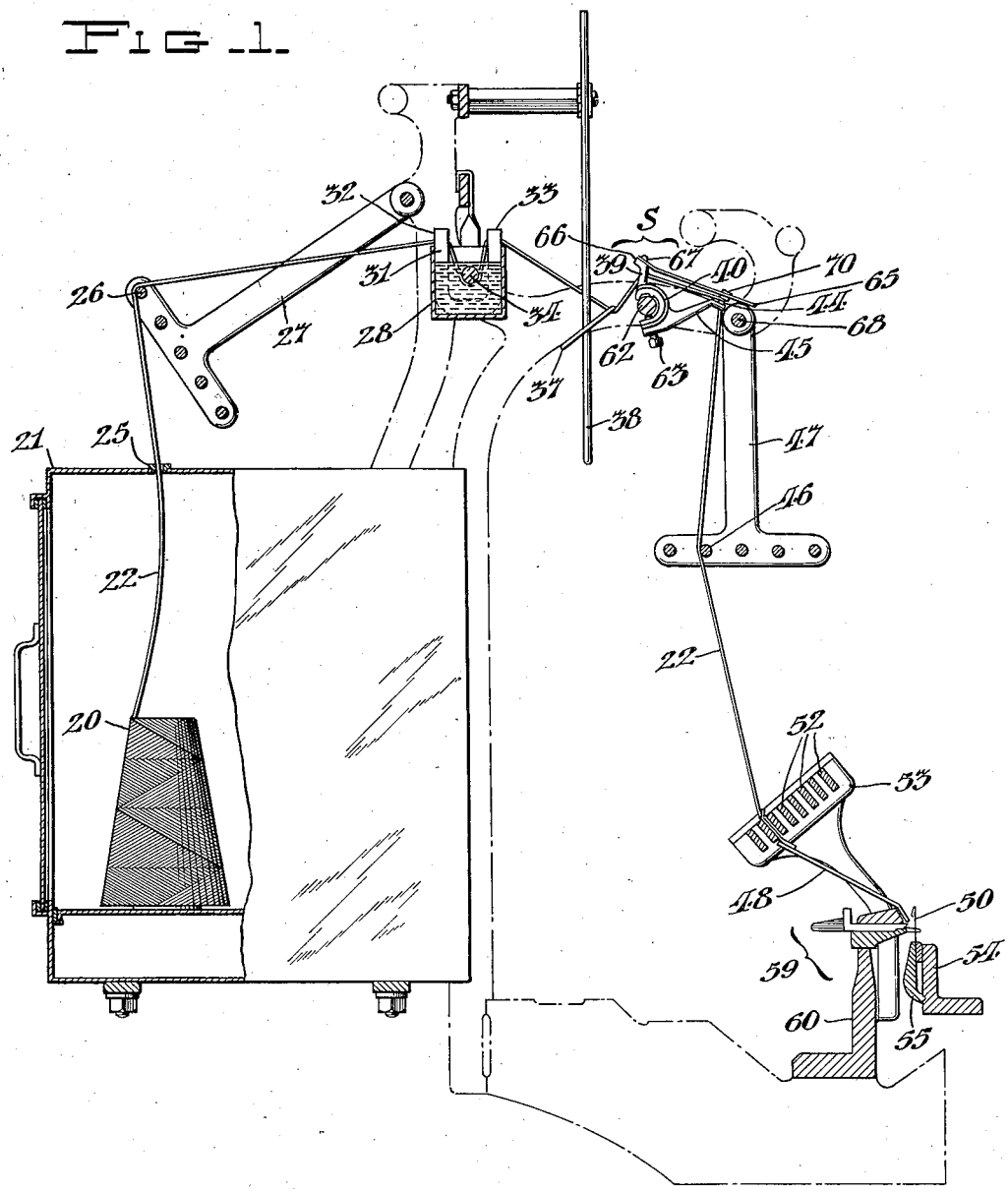

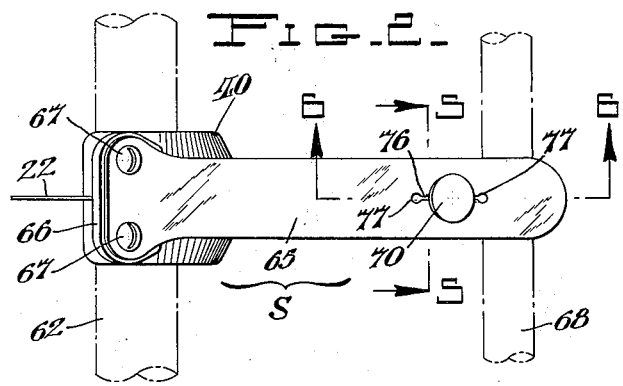
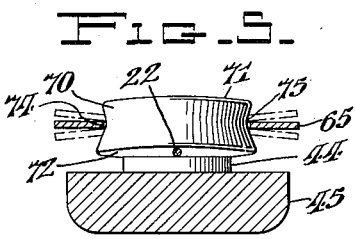
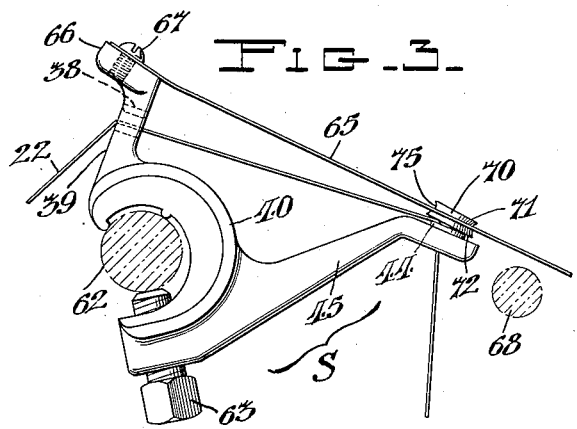
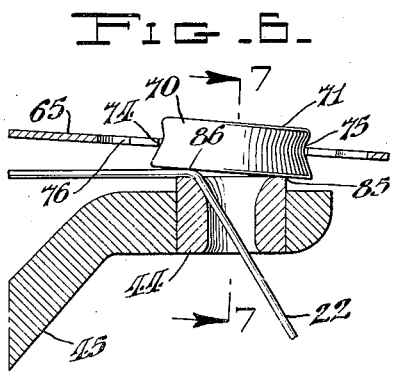
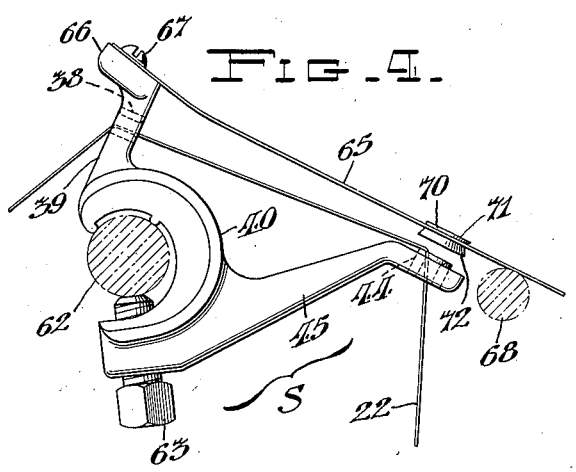
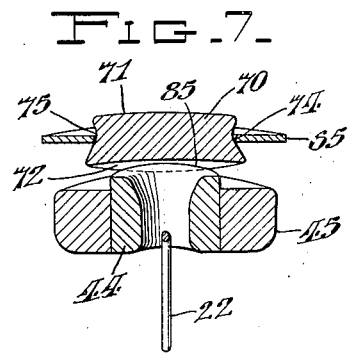

Dec. 24, 1935.   G. GASTRICH   2,025,383
YARN CONTROL AND CONTACT MEANS
Filed Sept. 22, 1934   4 Sheets-Sheet 4
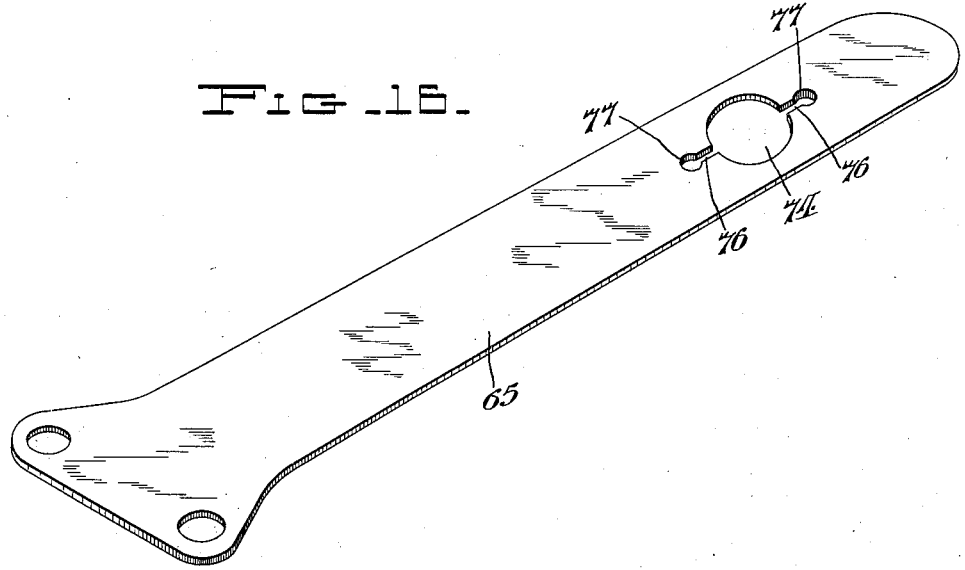
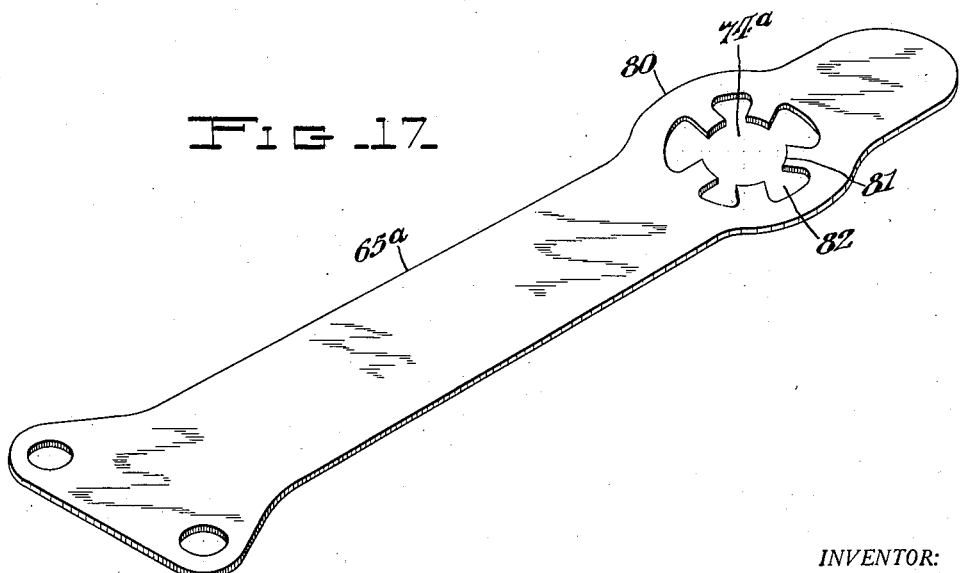
INVENTOR:
Gustav Gastrich,
BY Alfred E. Oschinger,
ATTORNEY.

Patented Dec. 24, 1935

2,025,383

UNITED STATES PATENT OFFICE 2,025,383

YARN CONTROL AND CONTACT MEANS

Gustav Gastrich, Wyomissing, Pa., assignor to Textile Machine Works, Wyomissing, Pa., a corporation of Pennsylvania Application September 22, 1934, Serial No. 745,085

14 Claims. (Cl. 66—146)

My invention relates to yarn supporting and directing devices, and particularly to means for guiding and tensioning yarns between the sources of supply and the knitting mechanisms of knitting machines.

In a full fashioned hosiery-knitting machine, devices, known as "snappers", are disposed between the yarn-supply cones, in the moistening boxes at the rear of the machine, and the needle-banks and sinker-head assemblies at the front of the machine. These snappers are well known, and usually comprise a support having a pair of arms or members, one of which is rigid and the other flexible, extending along the yarn; the support being mounted for actuation in well known manner, to cause the free ends of the arms, facing toward the needles, to operate as intermittently opening-and-closing yarn-clamping jaws. One of the arms, usually the upper arm, is in the form of a thin metal leaf spring which, by reason of its resiliency and its fixation at its rear end to the support, has a substantially pivotal or fulcrumed movement relative to the rigid arm. An opening at right angles to the fulcrum axis extends through the rear of the device for the passage of the yarn lengthwise of the arms therebetween to the free ends, where the yarn passes downwardly through an opening in the lower free end or clamping jaw. At its point of passage through the latter opening, the yarn is alternately clamped and released by movement of the upper, or resilient arm relative to the lower arm, which action is effected by a linkage of the snapper with a cam on the cam shaft. This linkage periodically pivots the snapper as a unit about an axis at right angles to the arms adjacent to the rear ends thereof, such that the front end of the resilient arm, which projects forwardly beyond the adjacent end of the rigid arm, engages a stationary bar parallel to its fulcrum, for lifting it off the yarn. This action occurs during the rapid feeding of a relatively great length of the yarn by a yarn-carrier in traversing the needle bank. During the upward and downward movement of the needles, the above-mentioned cam-controlled linkage also moves the snapper so that, altho the yarn remains clamped by the snapper, it is moved bodily rearwardly and forwardly to prevent the introduction of slack yarn at any point in the knitting field. This action is of usual character and particularly desirable to maintain the proper condition of yarn tension to produce uniform loops and selvedge-edges in the fabric being knitted.

Heretofore, in a "snapper" of this kind, it has been usual, in guiding the yarn therethrough, to employ a porcelain eyelet in the rear opening for the yarn, and in the upright front opening in the lower rigid jaw through which the yarn passes to the carrier. It has been usual also to have a circular opening in the spring over the front opening.

An early recognized defect in such devices resided in the contact of the yarn with the metal of the snapper, wherein the metal became so worn by the silk as to cause snags which sometimes impaired the yarn, or severed it, necessitating the shutting down of the particular machine section effected thereby with resultant loss of production of the machine. Attempts to remedy this defect resulted in various arrangements of the porcelain, such as providing a smooth rounded bead or a rounded edge thereof above the rigid arm, and, in another device, as by providing an apron integral with the eyelet and covering substantially the entire area of the top side of the lower arm adjacent to the eyelet.

However, porcelain, or similar refractory or ceramic product, such as glass or the several modifications of vitrified products of this general nature, are difficult to produce on such very small scale as in the eyelets herein considered, without irregularities or undulated surface portions caused by warpage in firing or melting, and cooling. Also, in large-scale commercial production, it is not always feasible to maintain microscopic accuracy of fit, either between the porcelain eyelet and the rigid arm, or between the resilient arm and the eyelet, and, since the silk yarn or thread is itself of very small gauge, it is easy to have, in such devices, non-uniformity in the clamping action on the thread.

For proper tensioning of the yarn, it is important to have this clamping action as uniform as possible, and it is among the objects of this invention to provide such uniformity, irrespective of the irregularities above pointed out. The result is attained in one instance by having one or both of the clamping faces substantially floatingly or universally-relatively-movable with respect to the other, so that, irrespective of a natural tendency of the clamp faces to be in non-conforming relation when separated, they will, when brought together, automatically seek a position effectively clamping the yarn. This self adjustment is attained also irrespective of variation in position which may be asumed by the yarn between the clamping faces.

Another object, in connection with such feature, is to also prevent all contact of the yarn with the metal, and, so far as they may be new in relation to, or separate from, such feature, to provide other advantages such as a substantially snap-fastener relation between a porcelain or other non-metallic clamp or guide and its support, a novel resilient finger, new porcelain elements and other features which will herein appear.

Another object is to provide an element which, without requiring any change whatsoever in the form of certain existing snappers or like elements having openings like the above-mentioned circular openings in the leaf springs, is adapted for use therewith as by being formed as an eyelet or button for the simple snap-action insertion into an opening of such character, thereby to adapt such snappers to obtain the advantages above pointed out.

A further object is to provide a device of the above indicated character that shall be simple and durable in construction, economical to manufacture, easy to install and effective in its operation.

With these and other objects in view, which will become apparent from the following detailed description of the illustrative embodiment of the invention shown in the accompanying drawings, the invention resides in the novel elements, features of construction and arrangement of parts in cooperative relationship, as hereinafter more particularly pointed out in the claims.

In the drawings:

Figure 1 is a view, partially in elevation and partially in transverse, or front-to-back, section, of a portion of a full-fashioned knitting machine, indicating generally the device of the invention, and its location in the machine, Fig. 2 is an enlarged top plan detail view of the structure of the invention, and a portion of its support, Fig. 3 is a side elevational view of the device of Fig. 2, as positioned in Fig. 1, with the parts as related during clamping of the yarn, Fig. 4 is a view similar to Fig. 3, with the parts as related during release of the yarn, Figs. 5 and 6 are further enlarged detail views, taken substantially along the lines 5—5 and 6—6, respectively, of Fig. 2, Fig. 7 is a view, taken substantially along the line 7—7 of Fig. 6, Figs. 8, 9, 10, 11 and 12 are views corresponding to Figs. 2, 3, 4, 5 and 6, respectively, of a modified form of the invention, Figs. 13 and 14 are detail perspective views of porcelain elements shown in Figs. 8 to 12, inclusive, Fig. 15 is a view similar to a portion of Fig. 10, showing a further modified form of the invention, and Figs. 16 and 17 are greatly enlarged detail perspective views, respectively, of a preferred and a modified form of spring element of the invention.

A part of a Reading full-fashioned hosiery knitting machine is indicated in Fig. 1, in which, however, for clearness, only those elements are shown which are necessary to an understanding of the invention, the other parts and the operation thereof being well known, as fully shown and described in the "Reading" Full Fashioned Knitting Machine Catalogue, Copyright 1929, and published by the Textile Machine Works, Reading, Pennsylvania.

As indicated in Fig. 1, a yarn supply cone 20 is disposed in a moistening box 21 at the rear of the machine, the yarn 22 being led upwardly through a guide eyelet 25 and over a guide rod 26, on a bracket 27, to a moistening trough 28. A "felt" 31, of substantially U-shape, is immersed generally in a body of liquid in the trough 28 but has free ends 32 and 33 through which the yarn 22 passes, and below, and between, which a glass guide rod 34 is disposed for guiding the yarn into and out of the liquid between the felt ends 32 and 33. From the felt end 33, the yarn extends through a tension ring 37, on a rod 36, and, from the ring 37 to the "snapper" S, where it passes forwardly through a porcelain eyelet 38, see Figs. 3 and 4, in an opening in an arm 39 at the rear end of a body or base portion 40. From the eyelet 38, the yarn passes to another porcelain eyelet 44, in a front arm 45, through which latter eyelet the yarn descends generally perpendicularly to a guide bar 46 on a bracket 47; and from the bar 46 to a carrier 48 which feeds it to the needles 50. The carrier 48 is mounted on one of a plurality of carrier rods 52 which are longitudinally reciprocally mounted on brackets, of which one bracket 53 is shown. The needles 50 are arranged in a bank held by a usual needle bar 54 and its cooperating clamp member or members 55. A sinker-head assembly 59, carried on a center bed 60, cooperates with the carrier 48 and the needles 50 to knit or form a usual looped fabric.

Referring to Figs. 1 to 7, inclusive, in a preferred form of the "snapper" embodying the invention, the base 40 is of substantially C-shape having an open side by which it may be placed laterally on a shaft 62 and held thereto by a set screw 63; the shaft 62 being adapted for intermittent turning movement by a usual connection to the main cam shaft of the knitting machine.

A flat relatively thin leaf spring 65 is secured, at its rear end, to a shelf portion 66 of the arm 39, by screws 67, and extends forwardly, over the yarn 22, substantially parallel thereto and to the arms 39 and 45, to a position well beyond the front end of the arm 45, toward the right, as shown in Figs. 1, 2, 3 and 4, where it is disposed over a rod 68 held stationary on the machine frame or support.

Certain springs corresponding to the spring 65, heretofore employed, have been of solid sheet or strap form throughout, and others provided with circular openings at the positions over the eyelets corresponding to the eyelets 44 to surround the protruding upper ends of the eyelets. In each case, the spring metal directly engaged the silk, and the irregularities of clamping, above mentioned, were incurred. If either the eyelet or the spring of a device of this character, as heretofore employed, was "skewed", which often happened and was difficult to detect and correct in elements of such small scale, and with the appreciable lateral shifting of the fine-gauge yarn, the clamping action was imperfect, and different in snappers intended to be of identical construction. It is, however, important to have this clamping action and the resultant yarn tension uniform, and as nearly the same in like machines or knitting sections as possible.

This result is attained by providing a yarn-contact element 70 carried by the spring 65 and loosely related thereto over the eyelet 44 such that it has substantially universal movement relative to the spring, the eyelet and the yarn, so that, irrespective of variations in the structure of the arm 45, the eyelet 44 and the spring 65, or of the relation thereof, within limits, the element 70 will automatically assume a broad-area effective clamping relation over, and on, the eyelet 44 and the yarn.

In the form of Figs. 1 to 7, inclusive, the element 70 is preferably constituted as a porcelain button or disk having opposite end face portions 71 and 72 of only slightly different area or diameter, each however, of greater diameter than an opening 74 in the spring substantially conforming thereto, see Fig. 16, and having therebetween a perimetral groove or depression 75 of smaller diameter than the opening 74. Having the end face portions 71 and 72 of different area, provides a noticeable difference between the faces facilitating a selection of one of them for finishing, and rendering it necessary to finish only one face, as by glazing or polishing, for operation as the clamping face, and facilitates the positioning of the button during assembly, when it is merely snapped small end first into the opening 74. These faces may be of different areas and shapes, and one or both finished as desired. Also, the areas 72 may be of different areas in different buttons having like areas 71 for cooperation with spring openings of the same size and shape.

Altho, the opening 74, as in springs heretofore employed, may be completely circular, or closely conform to the perimeter of the button, and still permit the button to readily snap into place, the spring may be rendered of greater resiliency for the snap effect than in the case where the opening thus merely conforms to the button, as by providing radial cuts or slots 76 communicating with the opening 74, and preferably having enlargements 77. This effect may be obtained in various other ways, as by reducing the thickness of the metal near the opening, by fluting or channeling such metal, or, as shown in Fig. 17, by providing an enlarged area 80 on a spring 65a having, in effect, an opening 74a, corresponding to the above-mentioned opening 74, but formed by the inner ends of radial projections 81 in a larger opening 82 in the area 80. This increased resiliency facilities assembly and reduces the likelihood of injury to the parts, by requiring less force to insert the button 70. In operative position, the latter is in loosely interfitted relation to the spring, positively interlocked against withdrawal in either direction, in response to all forces ordinarily met in service, but easily removable by a snap action similar to that by which it was inserted.

As indicated in Fig. 5, in dot-and-dash lines, the spring 65 near its free end may assume a position tilted in one direction or the other about the longitudinal axis of the spring from a position, indicated in full lines, symmetrically over the eyelet 44, in which case, the spring would not seat uniformly on the eyelet or on the yarn. It was customary, where such tilting was noticeable, or where the gripping of the yarn was not effective, to twist the spring in the direction of the dot-and-dash lines, in an endeavor to have it in proper relation to the eyelet and the yarn. With the button 71 loosely seated in the spring, such tilting of the spring, within reasonable limits, is automatically compensated for by the free movement of the button to seek its proper position.

As seen in Fig. 4, wherein the spring 65 is lifted by the rod 68, the button 70, by reason of its loose position in the spring opening, assumes a position in substantially parallel-plane relation to the spring. This position may be of various degrees of accuracy, depending upon the fit and shape of the parts, without affecting the effectiveness of the clamping action in the position of the parts of Figs. 3, 6 and 7. As seen in Fig. 6, the button 70 is tilted to engage the eyelet, at a position 85, and the yarn 22 at a position 86. This is assuming that the parts have perfect shape and fit, which however, is immaterial, since, even with minor discrepancies in the shapes of adjacent faces of the parts, by reason of the tilting action, the parts will assume positions in which the yarn is clamped substantially as shown. That is, there will always be a point on the button engaging the yarn, relative to which there will be another point on the button engaging the eyelet 44 in substantially the same relation, and with substantially the same force, irrespective of whether the same points engage each time, and of the shifting of these points about the eyelet. This could not be true with the button fixed to the spring, or at least, not true to the extent of having the corresponding points in each of several snappers operate as uniformly like the others as by the invention.

Uniform action of the snapper is important in clamping and releasing the yarn in accordance with the movements of the carrier 48 and the needles 50. When the carrier 48 starts its traversal of the needle bank, action of a cam on the machine cam shaft, turns the shaft 62 clockwise, as viewed in Figs. 1, 3 and 4, to cause the forward end of the spring 65 to engage the stationary rod 68. This movement lifts the button 70 off the yarn 22, in which position it is held while the yarn course is being laid. During the further knitting movement, wherein the needles descend and rise, the snapper, while disengaged from the bar 68 and again clamping the yarn, is moved by the cam action of its shaft 62 to move the yarn bodily lengthwise, in the forward direction when the needles descend, and in the rearward direction, when the needles rise, thus preventing the feeding of yarn during an action, which altho requiring longitudinal movement of the yarn, does not require any more yarn.

In the form of the invention illustrated in Figs. 8 to 14, inclusive, in which corresponding parts are designated by corresponding reference characters, an eyelet 44a cooperates with a loose clamp jaw element 70a on the spring 65. The element 70a, instead of being a solid button, like the button 70, is of ring or sleeve form having general over-all shape and dimensions similar to those of the solid button, and cooperating with an opening in the spring in like manner, but telescopically fitting or nesting a projection 87 on the eyelet 44a such as to form a crimp or bend 88, Figs. 9 and 12, in the yarn whereby to ensure effective clamping of the ring perimeter 89 on an annular seat 90 surrounding the projection 87.

In Fig. 15, a lower arm 45b of a body 40 is shortened, and provided, at its outer end, with a leaf spring 92 secured thereto by screws 93 and having an opening similar to any of the spring openings above set forth.

An eyelet 44b is shaped, in general, like the eyelet 44a, but is provided with a perimetral groove between its end faces, like the groove 75. The eyelet 44b, and the eyelet 70a for cooperation therewith, are each loosely mounted, and thereby each self adjustable relative to the other. The arrangement of the eyelet on the spring 92 adapts the eyelet for ready snap-action mounting as a thread guide in any place where such guide is desired. Also, in the structure of Fig. 15, the eyelet 70a may be replaced by the solid button 70, the eyelet 44b replaced by the eyelet 70a, or eyelets 70a disposed one in each of the springs.

Of course, the improvements specifically shown and described by which I obtain the above results, can be changed and modified without departing from the invention herein disclosed and hereinafter claimed.

I claim:

1. A device for guiding and tensioning the yarn between a yarn supply and the knitting mechanism of a knitting machine, comprising two members one of which is movable relative to the other and between which members the yarn passes to be alternately clamped and released thereby, and a separate clamp-face element for one of said members, said element and said one member cooperating to receive each other into interlocking loose relation by a substantially snap effect.

2. A device for guiding and tensioning the yarn between a yarn supply and the knitting mechanism of a knitting machine, comprising two members one of which is movable relative to the other and between which the yarn passes to be alternately clamped and released thereby, and a separate clamp-face element for one of said members said element and said one member cooperating for interlocking loose attachment to, and release from, each other by a substantially snap effect.

3. A device for guiding and tensioning the yarn between a yarn supply and the knitting mechanism of a knitting machine, comprising two members one of which is movable relative to the other and between which members the yarn passes to be alternately clamped and released thereby, one of said members including a portion of substantially leaf-spring character having an opening therethrough for loosely receiving a separate clamp-face element into interlocking relation thereto by a substantially snap-fastener effect, the spring material about said opening conforming generally to the contour of said element to effectively seat the same but also being constituted to have greater resiliency for said snap effect than if merely conforming to the element.

4. A device for guiding and tensioning the yarn between a yarn supply and the knitting mechanism of a knitting machine, comprising two members one of which is movable relative to the other and between which the yarn passes to be alternately clamped and released thereby, one of said members including a portion of substantially leaf-spring character having an opening therethrough, and a separate clamp-jaw for said one member in the form of an element generally conforming to said opening but slightly larger and having a perimetral groove between front and rear faces thereof providing for snapping the jaw into the opening in loose interlocking relation to the spring.

5. A device for guiding and tensioning the yarn between a yarn supply and the knitting mechanism of a knitting machine, comprising two members one of which is movable relative to the other and between which members the yarn passes to be alternately clamped and released thereby, a separate clamp-jaw element for one of said members having an aperture through which the yarn passes, said jaw element having an annular clamp-jaw face about said aperture and an annular portion about the opening between the latter and said annular face projecting toward the other of said relatively movable members, and a separate clamp-jaw element for said other member having a portion to substantially telescopically receive said projecting portion and an annular clamp-jaw face complementary to said first clamp-jaw face.

6. A device for controlling the yarn of a knitting machine, comprising a leaf spring for mounting on a support and having an opening therethrough for the substantially snap-fastener reception into loosely mounted position therein of a porcelain-like element to interlock with the spring, the spring material about said opening conforming generally to the contour of said element but also being constituted to have greater resiliency for the snap action than if merely conforming to said contour.

7. A device for controlling the yarn of a knitting machine, comprising a porcelain-like element having opposite-end surfaces substantially conforming to, but slightly larger in diameter than, an opening in a leaf-spring member, and a grooved perimetral portion between said surfaces rendering the element capable of snap-action insertion into said opening for loosely interlocked relation to the spring.

8. A device for guiding and tensioning the yarn of a full-fashioned knitting machine, comprising a base including a body portion for mounting on a cam-controlled shaft and having rear and front arms projecting upwardly and forwardly therefrom, said rear and front arms having rear-to-front and upright apertures, respectively, therethrough, porcelain eyelets disposed one in each of said apertures for the passage of yarn therethrough from rear to front, a leaf spring secured to said rear arm over the rear eyelet extending parallel to the yarn path thereover between the eyelets to a position beyond the front end of the front arm and having an opening through the spring over the front eyelet, and a porcelain element loosely interlocked with the spring in said opening, the spring being normally biased to clampingly engage said porcelain element against the yarn in the eyelet in said upright front arm aperture and the front end of the spring constituting means for lifting the spring against said bias.

9. A device for a yarn-working machine, comprising a support including a thin sheet having an aperture and a plurality of portions projecting radially inwardly from the perimeter of the aperture, the inner ends of the radial projections defining an opening smaller than said aperture, and a yarn-engaging element of vitreous material having a perimetral groove between its ends of smaller diameter than said opening and perimetral shoulders of larger diameter than said opening at opposite sides of the groove adapting the element to be moved into the opening and said projections to be moved to increase the diameter of the opening and to thereby receive the element so that said projections surround the element in the groove, and the shoulders lock the element against withdrawal in either direction from said opening.

10. A knitting-machine yarn snapper comprising a shaft, a base fixed to the shaft including a pair of arms projecting transversely to the shaft, one of the arms having a transverse opening therethrough between its ends and having an outer-end seat, and the other arm having an opening through its outer end transversely to the first opening, vitreous-material eyelets disposed one in each of the openings, a thin leaf spring secured at one end to the seat and extending to, and beyond, a position over the second opening toward which it is biased, the spring having an opening for register with the eyelet in the second opening, and a vitreous-material element of slightly larger diameter than the spring opening having a perimetral groove between perimetral shoulders adapting the element to be snapped into the spring opening to prevent accidental removal of the element in either direction from the opening and seating it loosely in the spring for substantially universal floating movement automatically seating it by the spring on yarn extending through the eyelets, and a stationary member for engagement by the free other end of the spring in response to turning of the shaft for lifting the spring and raising the element off the yarn.

11. A knitting-machine yarn snapper comprising a shaft, a base fixed to the shaft having portions for supporting eyelets extending transversely in substantially spaced relation to each other, vitreous-material eyelets for said portions, the base having a seat near one of said eyelets, a laterally-deflectable elongated spring element secured to the seat adjacent to said one eyelet and extending to a position over the other eyelet toward which it is laterally deflectably biased, a vitreous-material element for snapping into loose floating interlocking operative relation to the spring element, the latter having means for snappingly receiving said snapping element in register with said other eyelet for substantially universal movement automatically seating the snapping element by lateral deflection of the spring against yarn extending through said eyelets, and a member for engagement by the spring in response to turning of the shaft for lifting the spring and raising the element off the yarn.

12. A knitting-machine yarn snapper comprising means for supporting eyelets in substantially spaced relation extending transversely to each other and providing a seat adjacent to one of the eyelets, a laterally-deflectable elongated spring mounted on the seat and extending to a position opposite the other eyelet toward which it is laterally biased, an element for snapping into loose-floating interlocking operative relation to the spring element, the latter having means for receiving said snapping element in register with said other eyelet for substantially universal movement automatically seating the snapping element by the spring on yarn extending through the eyelets, and means for moving the spring to disengage the element from the yarn.

13. A device for guiding and tensioning the yarn between a yarn supply and the knitting mechanism of a knitting machine, comprising two members one of which is movable relative to the other and between which members the yarn passes to be alternately clamped and released thereby, one of said members having an eyelet through which the yarn passes, and a separate annular clamp jaw element for the other member opposite said eyelet automatically adjustable relative thereto to position in which the face of the annular clamp jaw element is tilted between a point of contact with the yarn adjacent to the perimeter of the eyelet and at least one point on the other member.

14. A device for guiding and tensioning the yarn between a yarn supply and the knitting mechanism of a knitting machine, comprising two members one of which is movable relative to the other and between which members the yarn passes, and through one of which members the yarn passes, to be alternately clamped and released thereby, and separate clamp-face elements for said members including one element substantially in the form of a ring adapted for telescopic relation to the other element, the ring having an annular portion for telescoping the other element and a portion for abutting relation to the other element adjacent to said annular portion.

GUSTAV GASTRICH.